July 3, 1956 — V. V. GUZAUSKI — 2,753,549
DEVICE FOR INDICATING THE CHANGE OF SPEED NECESSARY TO MAINTAIN AN AVERAGE SPEED OF A VEHICLE
Filed July 15, 1955 — 2 Sheets-Sheet 1

INVENTOR.
VICTOR V. GUZAUSKI
BY
McMorrow, Berman + Davidson
ATTORNEYS

July 3, 1956  V. V. GUZAUSKI  2753,549
DEVICE FOR INDICATING THE CHANGE OF SPEED NECESSARY
TO MAINTAIN AN AVERAGE SPEED OF A VEHICLE
Filed July 15, 1955  2 Sheets-Sheet 2

INVENTOR.
VICTOR V. GUZAUSKI
BY
McMorrow, Berman + Davidson
ATTORNEYS

United States Patent Office 2,753,549
Patented July 3, 1956

2,753,549

DEVICE FOR INDICATING THE CHANGE OF SPEED NECESSARY TO MAINTAIN AN AVERAGE SPEED OF A VEHICLE

Victor V. Guzauski, Rochester, N. Y.

Application July 15, 1955, Serial No. 522,362

3 Claims. (Cl. 340—268)

The present invention relates to a device for indicating the change of speed necessary to maintain an average speed of a vehicle.

The primary object of the present invention is to provide a device to indicate the increase or decrease in speed necessary to maintain an average set speed in a vehicle.

Another object of the present invention is to provide a device for a vehicle which may be set for a predetermined time interval and will indicate the increase or decrease in speed necessary to bring the vehicle back to the desired average speed in order to travel a desired distance in the interval of time selected.

A further object of the present invention is to provide an indicator for a vehicle to indicate the change in speed necessary to maintain an average speed having few moving parts, one simple in structure, sturdy in construction, and one which may be economically manufactured and assembled.

Figures 1, 2:
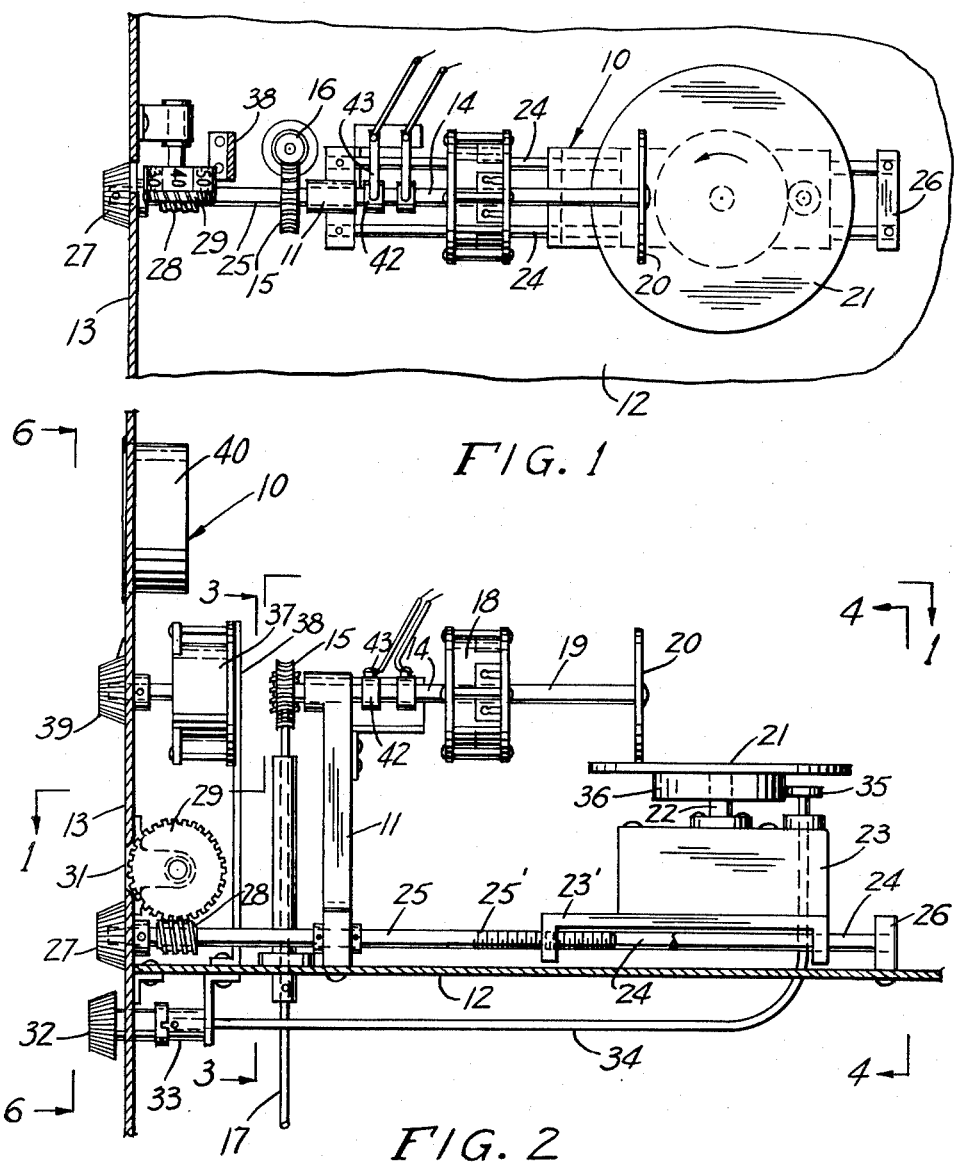
Figure 3:
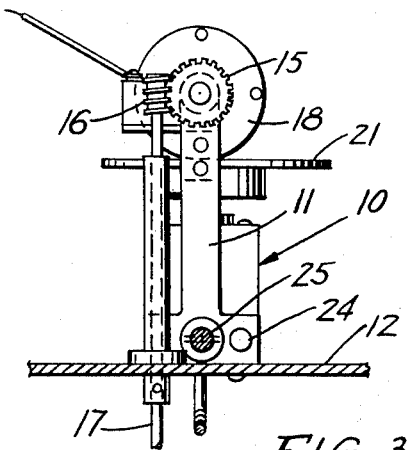
Figure 4:
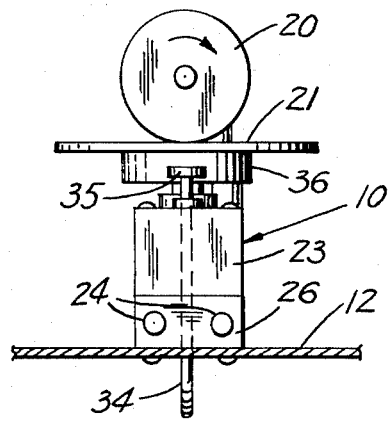
Figure 6:
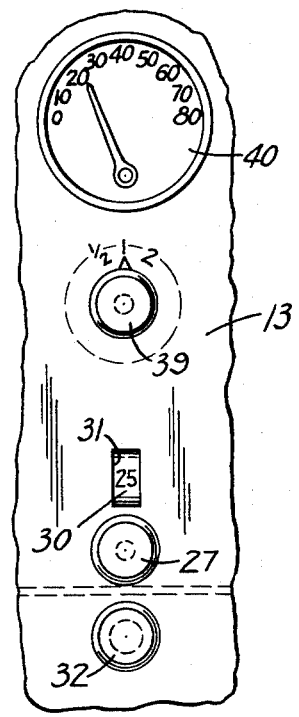
Figure 5:
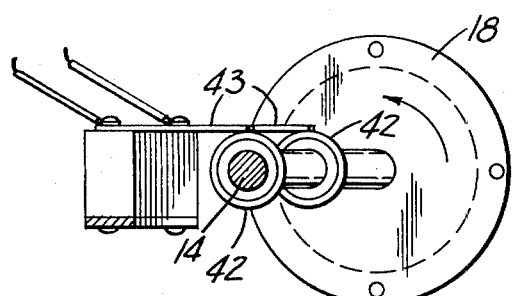
Figure 7:
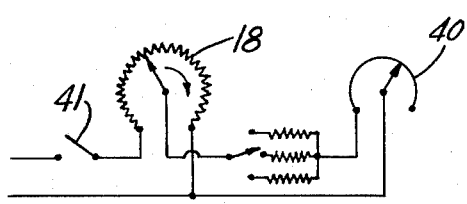

These and other objects and advantages of the present invention will be fully apparent from the following description when taken in connection with the annexed drawings, in which:

Figure 1 is a vertical view as on line 1—1 of Figure 2,

Figure 2 is a side elevational view showing the components of the present invention installed upon a vehicle instrument panel, Figure 3 is an end view taken on line 3—3 of Figure 2, Figure 4 is another end view on line 4—4 of Figure 2, Figure 5 is a fragmentary perspective view, greatly enlarged, of the contact rings and fingers and the one end of the potentiometer of the present invention, Figure 6 is a front view of the portion of the instrument panel as seen on line 6—6 of Figure 2, and Figure 7 is a diagram of the electrical circuit of the present invention.

Referring in greater detail to the drawings in which like numerals indicate like parts throughout the several views, the present invention consists in a device for indicating the change in speed necessary to maintain an average speed of a vehicle and is indicated generally by the reference numeral 10, the device comprising a standard 11 having its lower end supported upon a horizontally disposed support plate 12 projecting from the lower end of an instrument panel of the vehicle.

A shaft 14 is journaled in the upper end of the standard 11 for rotation about a horizontal axis parallel to said plate and carries on one end a gear 15 in mesh with a worm gear 16 on the free end of a flexible drive shaft 17, the latter being connected either to the vehicle wheels, speedometer, or odometer of the vehicle for rotation at a speed proportional to the vehicle speed.

The other end of the shaft 14 carries the casing of a potentiometer 18 having an annularly shaped resistance winding and a movable contact in engagement with the winding. Another shaft 19 projects into the face of the potentiometer 18 and is journaled therein in alignment with the shaft 14. The contact of the potentiometer is fixedly secured to the end of the shaft 19. Neither the winding nor the contact of the potentiometer are here shown. A vertically disposed wheel 20 is carried on the other end of the shaft 19 and has its perimeter in engagement with the upper face of a turntable 21 mounted for rotation about a vertical axis on the shaft 22 of a constant speed motor 23. The motor 23 is mounted upon a carriage 23' slidable on a pair of shafts 24, the carriage being threadedly connected to a horizontally disposed shaft 25 having a threaded portion 25' extending inwardly from one end thereof. A boss 26 supports the adjacent ends of the shafts 24 and the shaft 25, rotatable in either a clockwise direction or a counterclockwise direction, is supported intermediate its ends in a hole in the standard 11 and has one end projecting forwardly of the panel 13 with a knob 27 thereon.

A worm 28 on the shaft 25 carries a gear 29 which has a peripheral portion 30 visible through an aperture 31 in the panel 13, as seen in Figure 6, in which the numeral "25" on the portion 30 of the gear 29 indicates that an average speed of 25 miles per hour has been selected. The motor 23 is shiftable toward and away from the panel 13 by turning the knob 27 on the shaft 25 to vary the speed of rotation of the wheel 20.

A second knob 32 on the panel 13 has a slip joint or clutch 33 connecting it with one end of a flexible shaft 34 which has a drive wheel 35 on its other end frictionally engaging the periphery of a shoulder 36 on the shaft 22. When the knob 32 is engaged with the shaft 34, the turntable may be revolved by hand to set the rotatable contact within the potentiometer to a desired position relative to the winding therein.

A rheostat 37 is supported on the plate 12 by means of a bracket 38 and has a control knob 39 projecting forwardly of the panel 13. The rheostat 37 may be set for any one of a series of time intervals, here shown in Figure 6 to be "one-half hour," "one hour," "two hours," although other intervals may be used if desired.

An ammeter 40 is supported on the panel 13 and has its dial calibrated to indicate miles per hour from zero to eighty, or more if desired.

The wiring circuit is shown diagrammatically in Figure 7, there being a switch 41 to energize the circuit which includes the vehicle batteries, the latter not being shown, or other source of current. The rheostat 37 has a resistance winding for each of the time intervals desired, such as one-half hour, one hour, or two hours.

The operation of the present invention is as follows: If it is proposed that the vehicle travel for one hour at twenty-five miles per hour, the knob 27 is turned until the figure "25" appears as shown in Figure 6. This adjusts the motor 23 so that the wheel 20 rotates at a certain constant speed, carrying with it the movable contact within the potentiometer. As the vehicle travels, the drive 17 turns at a rate of speed proportional to the vehicle speed, carrying the body of the potentiometer along with it and in the same direction of rotation as its movable contact. The output of the potentiometer is carried by the contact rings and fingers (Figure 5) to the ammeter 40. When the potentiometer and its contact do not move relative to each other, the reading of the ammeter 40 will not change but if the vehicle slows down or speeds up above the desired average speed the contact within the potentiometer will shift its position on the winding therein either to increase or decrease the resistance of the winding, the result showing as a change on the ammeter. The indicating needle on the ammeter will swing to indicate the speed at which the vehicle should travel in order to bring it back to an average speed. The selection of the time interval by the knob 27 brings into the circuit one of the resistance windings of the rheostat to "pre-load" the potentiometer. Obviously, if a half-hour interval is chosen, it will be desirable to have a greater indication of the rate of increase or decrease necessary to bring the vehicle back to average speed than if a longer interval is chosen.

Normally, the turntable 21 is set to rotate at a relatively slow speed, one revolution every four hours, for example, and the drive 17 connects it to the speedometer drive or odometer drive and is similarly geared down to a like speed. The vehicle speed necessary to bring the vehicle back to average speed will show on the ammeter as soon as the contact in the potentiometer moves relative to the potentiometer itself. The knob 32 is used to adjust the turntable and the associated contact within the potentiometer to an adjusted reading of the desired miles per hour and thereafter any movement of the potentiometer contact relative to the potentiometer body will alter the ammeter reading to indicate the speed at which the vehicle should travel to bring it back to the desired average speed.

What is claimed is:

1. In a device for indicating the change in speed necessary to maintain a selected average speed of a vehicle, a support plate adapted to be supported in a horizontal position and having one end adapted to be attached to a vehicle panel, a standard having its lower end fixedly secured to said plate intermediate the ends thereof, a shaft extending longitudinally above and spaced from said plate and supported intermediate its ends on said standard adjacent the lower end of the latter for rotation in clockwise and counterclockwise directions, a carriage positioned above said plate connected to said shaft for reciprocatory movement responsive to rotary movement of said shaft, a constant speed motor having a shaft projecting from one end positioned on said carriage so that the motor shaft is vertically disposed with respect to said carriage, a horizontally disposed turntable carried by said motor shaft, a second shaft positioned above and parallel to said first-named shaft and rotatably supported on the upper end of said standard, a potentiometer casing having an annular shaped resistance winding and a movable contact engaging the winding fixedly secured to one end of said second shaft, a vertically disposed wheel having its perimeter contacting the upper face of said turntable and drivably connected to said contact, the other end of said second shaft being adapted to be connected to the vehicle wheels for rotation at a rate proportional to the speed of the vehicle, a source of electrical current, said potentiometer winding and contact being in circuit with said current source, and meter means in circuit with said winding, contact, and said current source for measuring the current flow through said winding as an indication of the increase or decrease in speed necessary to maintain a selected average vehicle speed.

2. In a device for indicating the change in speed necessary to maintain a selected average speed of a vehicle, a support plate adapted to be supported in a horizontal position and having one end adapted to be attached to a vehicle panel, a standard having its lower end fixedly secured to said plate intermediate the ends thereof, a shaft extending longitudinally above and spaced from said plate and supported intermediate its ends on said standard adjacent the lower end of the latter for rotation in clockwise and counterclockwise directions, a carriage positioned above said plate connected to said shaft for reciprocatory movement responsive to rotary movement of said shaft, a constant speed motor having a shaft projecting from one end positioned on said carriage so that the motor shaft is vertically disposed with respect to said carriage, a horizontally disposed turntable carried by said motor shaft, a second shaft positioned above and parallel to said first-named shaft and rotatably supported on the upper end of said standard, a potentiometer casing having an annularly shaped resistance winding and a movable contact engaging the winding fixedly secured to one end of said second shaft, a vertically disposed wheel having its perimeter contacting the upper face of said turntable and drivably connected to said contact, the other end of said second shaft being adapted to be connected to the vehicle wheels for rotation at a rate proportional to the speed of the vehicle, a source of electrical current, said potentiometer winding and contact being in circuit with said current source, meter means in circuit with said winding, contact, and said current source for measuring the current flow through said winding as an indication of the increase or decrease in speed necessary to maintain a selected average vehicle speed, manually operable means on the other end of said first-named shaft for effecting the reciprocatory movement of said carriage so as to adjust the rate of rotation of said wheel to a speed proportional to a selected vehicle speed, an indicator connected to said first-named shaft adjacent said last-named means for indicating the selected vehicle speed, and electrical means for varying the indication of said meter means in proportion to the differences between time of travel intervals.

3. In a device for indicating the change in speed necessary to maintain a selected average speed of a vehicle, a support plate adapted to be supported in a horizontal position and having one end adapted to be attached to a vehicle panel, a standard having its lower end fixedly secured to said plate intermediate the ends thereof, a shaft extending longitudinally above and spaced from said plate and supported intermediate its ends on said standard adjacent the lower end of the latter for rotation in clockwise and counterclockwise directions, a carriage positioned above said plate connected to said shaft for reciprocatory movement responsive to rotary movement of said shaft, a constant speed motor having a shaft projecting from one end positioned on said carriage so that the motor shaft is vertically disposed with respect to said carriage, a horizontally disposed turntable carried by said motor shaft, a second shaft positioned above and parallel to said first-named shaft and rotatably supported on the upper end of said standard, a potentiometer casing having an annularly shaped resistance winding and a movable contact engaging the winding fixedly secured to one end of said second shaft, a vertically disposed wheel having its perimeter contacting the upper face of said turntable and drivably connected to said contact, the other end of said second shaft being adapted to be connected to the vehicle wheels for rotation at a rate proportional to the speed of the vehicle, a source of electrical current, said potentiometer winding and contact being in circuit with said current source, meter means in circuit with said winding, contact, and said current source for measuring the current flow through said winding as an indication of the increase or decrease in speed necessary to maintain a selected average vehicle speed, manually operable means on the other end of said first-named shaft for effecting the reciprocatory movement of said carriage so as to adjust the rate of rotation of said wheel to a speed proportional to a selected vehicle speed, an indicator connected to said first-named shaft adjacent to said last-named means for indicating the selected vehicle speed, electrical means for varying the indication of said meter means in proportion to the differences between time of travel intervals, and other manually operable means connectible to said turntable for adjusting said contact relative to said winding.

References Cited in the file of this patent

UNITED STATES PATENTS

| 2,387,901 | Haverstick | Oct. 30, 1945 |
| 2,706,288 | Lindholm et al. | Apr. 12, 1955 |
| 2,731,630 | Karlson | Jan. 17, 1956 |